Patented Mar. 17, 1942

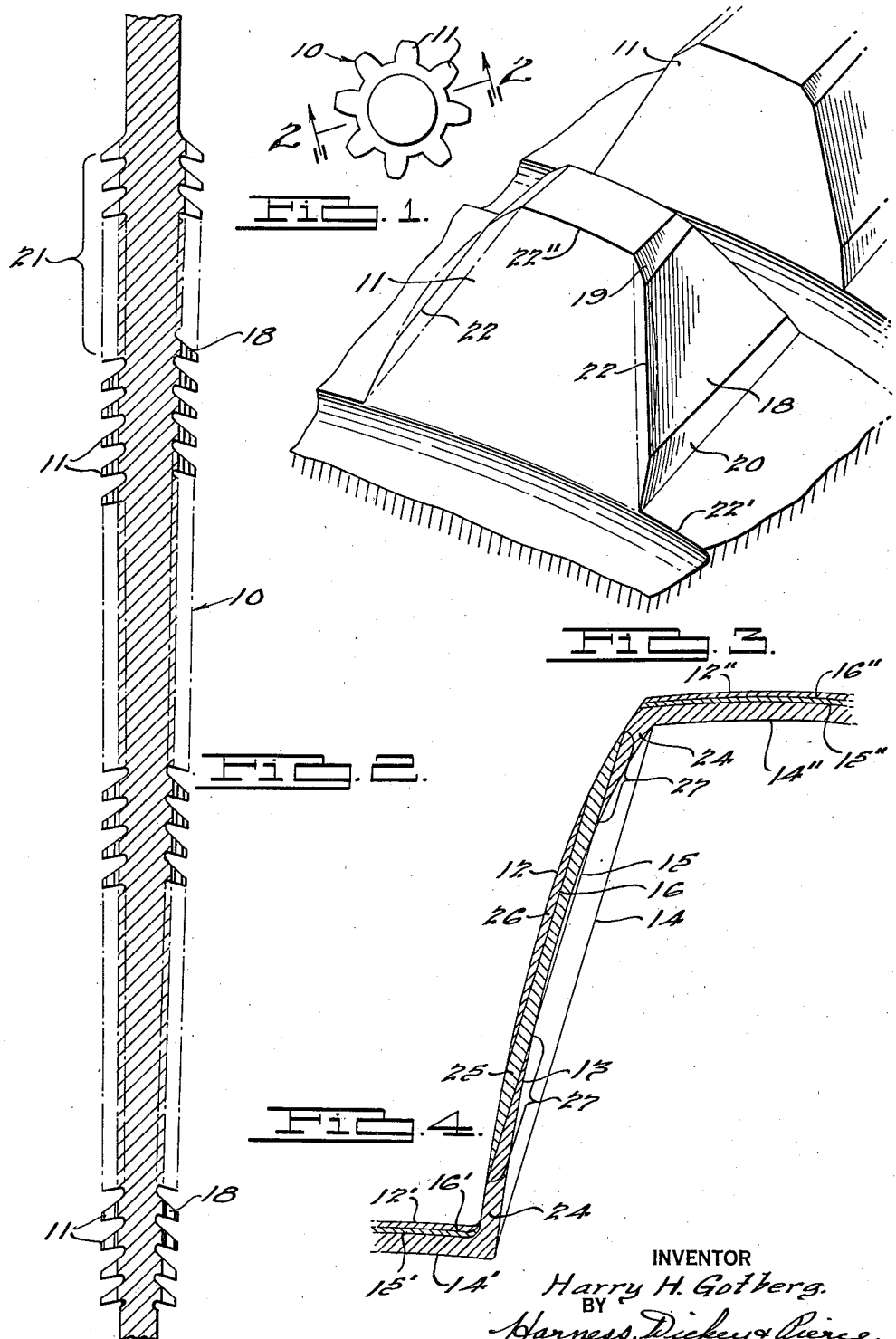

2,276,385

UNITED STATES PATENT OFFICE 2,276,385

BROACH

Harry H. Gotberg, Detroit, Mich., assignor to Colonial Broach Company, Detroit, Mich., a corporation of Delaware Application December 7, 1940, Serial No. 368,974

3 Claims. (Cl. 29—95.1)

The present invention relates to a broach for finishing hardened internal involute toothed forms and the like, such as internal involute gears or splines. It is also applicable to finish broaching of any internal toothed form in which the sides of the teeth have a concave curvature, whether involute, modified involute, or otherwise.

It is the practice in forming internal involute splines or gears to broach the spline or gear to approximate final form prior to the hardening operation. Thereafter, the spline or gear is hardened and due to distortion which results from the hardening operation, it is necessary to perform a finish broaching operation to bring the spline or gear to the desired final form. In this finishing operation, in the ordinary case, very little material is removed but serious difficulties are encountered because of the hardness of the material being cut. It is the usual practice in such finish broaching to form a broaching tool, each tooth of which is formed in the shape of the gear or spline tooth space and cuts the entire side profile of the gear or spline teeth on opposite sides of that space. In accordance with this practice, each broach tooth has an involute side cutting edge which must be relieved or backed off and it is an extremely difficult and expensive hand operation to back off an involute form cutting edge to a sharp edge without destroying the involute form. In addition, broaches of this type are subject to exceedingly heavy loads because of the width of the cut and the fact that the chip being curved transversely to the direction of the cut resists the necessary curling which must accompany its removal from the part.

It has been suggested that the above mentioned difficulties may be overcome by providing a finishing broach in which the first cutting tooth is only slightly higher than the root diameter of the internal gear or spline to be cut, but is of the full width of the final tooth form and by providing similar successive broach teeth of increasing radial projection. These teeth cut only at their corners and remove the metal along the involute tooth sides of the gear or spline progressively from the root to the crest of the gear or spline tooth space. This type of broach, however, performs all of its cutting on a sharp corner with the result that the corners of the teeth are subject to excessive wear and are quickly broken down.

It is the object of the present invention to provide a novel form of finish broach adapted to finish internal involute splines or gears and the like, in which the above mentioned difficulties are overcome.

More specifically, it is the object of the present invention to provide a finish broach for internal involute gears or splines which is easy to manufacture and to sharpen, which is not subject to excessive wear and which is easy to pull through the work.

Other objects and advantages of the invention will become apparent from the following specification, the accompanying drawing, and the appended claims.

In the drawing:

Figure 1 is a trailing end view of a broaching tool in accordance with the present invention;

Fig. 2 is a section of the broaching tool taken on the line 2—2 of Fig. 1, parts being broken away;

Fig. 3 is an enlarged perspective view of one of the teeth of the broach intermediate its ends, and Fig. 4 is an exaggerated diagrammatic illustration of the manner in which successive teeth of the broach cut the work piece. It illustrates a fragmentary tooth profile as viewed in a section transverse to the axis of the broach.

Referring to the drawing, particularly to Fig. 1, it will be seen that the broach illustrated as one embodiment of the present invention is adapted to finish an internal involute toothed form in a spline or gear or the like, the broach indicated at 10 being provided with a plurality of rows of axially aligned teeth 11, each row being designed to finish the space between adjacent teeth of the workpiece. The particular broach illustrated is adapted to form a straight spline or an internal spur gear, but it will be apparent that the invention is equally applicable to broaches designed to finish helical internal splines or gears.

In the manufacture of the broach 10, all of the teeth in each row are initially formed with sides conforming to the profile of the desired finished form of the teeth of the workpiece. This form is illustrated diagrammatically in Fig. 4 by the involute line 12 extending from the root to the crest of the tooth. It may be noted at this point that the cross-hatched area in Fig. 4 represents diagrammatically the material which must be removed from the tooth space of the internal gear or spline in order to bring the internal gear or spline to its finished form. The side tooth profile of the unfinished internal gear or spline is therefore indicated diagrammatically by the line 13.

After the sides of all of the broach teeth are given the desired form of final profile indicated by the line 12, the first cutting tooth in each row is ground back to a flat surface extending parallel to the axis of the broach indicated diagrammatically by the line 14 in Fig. 4. The radial extremities of the flat surface 14 terminate at the root and crest of the sides 13 of the unfinished tooth profile. Each succeeding cutting tooth in each row is provided with a similar flat surface but these flat surfaces on opposite sides of the succeeding broach teeth are spaced progressively further apart. Thus, on a tooth subsequent to the first tooth, the flat surfaces at the sides thereof may conform to the line 15 in Fig. 4, and a still later cutting tooth will have its flat surface conforming to the line 16 in Fig. 4. It will be understood that in the diagram Fig. 4, the thickness of the material to be removed is greatly exaggerated for purposes of clarity and that the flat surfaces on almost all of the cutting teeth will terminate like the flat surfaces indicated by the lines 15 and 16 at their radial extremities at points of intersection with the final desired tooth profile 12. As a result, the majority of the cutting teeth will be of a form like that illustrated in Fig. 3 in which the sides of each tooth are provided with an intermediate flat portion 18 terminating at its radial extremities in outer and inner involute portions 19 and 20 which conform to the final side profile 12 of the internal gear or spline tooth. The only difference between the tooth illustrated in Fig. 3 and the following cutting teeth on the broach is that the flat surface 18 on the succeeding teeth will be progressively reduced in radial extent as indicated best in Fig. 2, until adjacent the trailing extremity of the broach, the flat surface 18 is of extremely narrow width.

Thereafter, the broach is provided with a plurality of finishing teeth in the section indicated at 21 in Fig. 2, each of which retains the full side profile 12 of the finished tooth. It will be understood that the lines 14, 15, and 16 in Fig. 4 do not represent the side profiles on succeeding teeth but that the broach will be provided with a number of teeth having profiles intermediate these two lines and that following the tooth having the flat profile indicated 16 will be a number of teeth having progressively smaller flat profiles approaching the final involute form 12.

After the broach teeth are provided with the flat side surfaces extending parallel to the axis of the broach in the manner previously described, the front edges of these flat surfaces are relieved by grinding back the flat surfaces 18 at an angle to the axis of the broach behind the front edges of those flat surfaces. No relief is provided upon the residual involute side portions of the broach teeth such as those indicated at 19 and 20 in Fig. 3. As a result, all of the cutting edges of the broach are straight cutting edges, such as the cutting edges 22 of the tooth illustrated in Fig. 3. These cutting edges being straight edges are easy to back off or relieve and there is no danger of impairing the final tooth form during the operation of relieving these straight edges because the edges do not conform to the final tooth form in any event. The involute toothed sections 19 and 20, since they are not relieved, will remain accurate in size and form and their front edges perform no cutting operation.

The action of the broach in finishing an internal gear or spline may best be seen by reference to Fig. 4. In that figure, the cross-hatched portions indicated 24 are removed by the cutting teeth between the first cutting tooth having the flat profile indicated by the line 14 and the cutting tooth having the profile indicated by the line 15. The cross-hatched portions indicated by the numeral 25 are removed by the teeth between the tooth having the straight profile indicated by the line 15 and the tooth having the straight profile indicated by the line 16. Likewise, the cross-hatched material indicated by the line 26 is removed by the teeth between the tooth having the straight profile indicated by the line 16 and the first finishing tooth in the section 21, all of which finishing teeth have the final involute tooth profile 12.

It will be noted in the case of the tooth having the profile indicated 15 in Fig. 4 that it performs its cutting only at limited end portions of the straight cutting edge indicated at 27 and that it does not cut intermediate the portions 27 or at the unrelieved involute edges spaced outwardly of the cutting portions 27. In order to show the nature of the cutting action, it was necessary to exaggerate in Fig. 4 the amount of metal to be removed, with the result that it would appear that relatively few teeth would cut in the manner of the tooth having the cutting edge 15. As a matter of fact, in the normal case, a majority of the cutting teeth would perform a cutting action only at their ends and would cut progressively inwardly from opposite extremities of the tooth side towards the center. The depth of cut of each tooth is relatively small being in the normal case in the order of .001 of an inch more or less on each side of the tooth, with the result that the fact that no relieved cutting edges conform to the final involute shape does not interfere with the cutting action.

In the diagram Fig. 4 is illustrated the cutting action when the broach is also designed to cut the tops and roots of the part. In this case, the tops and root areas are cut away by arcuate cutting edges having their centers at the axis of the tool. The broach tooth having the side profile 14 is provided in that case with a root profile 14' and a crest profile 14". Similarly, the tooth having the side profile 15 is provided with a root profile 15' and a crest profile 15" and the tooth having the side profile 16 is provided with a root portion having a profile 16' and a crest profile 16". The final cutting teeth have root profiles 12' and crest profiles 12".

Referring to the tooth shown in Fig. 3, the root cutting edge is indicated by the numeral 22' and the crest cutting edge by the numeral 22". These root and crest portions are relieved in the usual manner, but since the cutting edges are arcuate about the axis of the broach, no difficulty is encountered in relieving them by an ordinary grinding operation as in the case of involute cutting edges.

While the broach illustrated is adapted to cut at both the roots and crests of the broach teeth, in the usual pline or internal gear finishing operation no finishing is performed at the roots of the broach teeth, i. e. on the crests of the internal spline or gear, and in some cases no finishing is performed at either the roots or the crests. It is apparent, however, that the present invention, since it deals with the means for forming the involute side portions of the teeth, is equally applicable regardless of whether or not the root or crest portions or both are finished.

While only one embodiment of the invention has been shown, it is apparent that others are available within the spirit of the invention and within the scope of the appended claims.

What is claimed is:

1. A broach for finishing internal involute tooth forms and the like, said broach having a row of cutting teeth for each tooth space of said form, each cutting tooth of said row having a pair of converging straight relieved cutting edges for cutting on the sides of the tooth of said form on opposite sides of said gear tooth space, respectively, each straight edge on the first cutting tooth in said row being adapted to cut away metal at only the inner and outer extremities of the side of the adjacent tooth of said form, the straight sides of each succeeding tooth in said row being spaced further apart and effective to cut on progressively approaching points on the adjacent tooth side of said form, the later cutting teeth having the straight cutting edges thereof merging at the extremities of said edges in unrelieved portions conforming to the desired final side profile of the adjacent tooth of said form.

2. A broach for finishing an internal involute toothed form and the like, said broach having a row of cutting teeth for each tooth space of said form, each cutting tooth in said row having a pair of straight relieved cutting edges, one for cutting at the side of each tooth of said form adjacent said space, the straight cutting edges on succeeding cutting teeth in said row being spaced progressively further apart and terminating at their ends at the points of intersection of said straight cutting edges with the desired final profile of the sides of said teeth of said form, the remainder of the sides of each broach tooth having an unrelieved edge conforming to the desired final profile of the sides of the teeth of said form.

3. A broach for finishing an internal involute toothed form and the like, said broach having a row of cutting teeth for each tooth space of said form adapted to cut the sides of the teeth on each side of said space, each cutting tooth having a pair of straight relieved cutting edges, one for cutting the side of each adjacent tooth of said form, each straight cutting edge on the first cutting tooth in said row being adapted to cut at one extremity of the adjacent tooth side profile of said form, the straight cutting edges on succeeding teeth in said row being spaced progressively further apart whereby each succeeding tooth cuts progressively along the side of the adjacent tooth of said form from said extremity, each straight cutting edge on said succeeding cutting teeth that intersects the desired final tooth profile of said form merging at that point with an unrelieved edge having the desired final profile of the adjacent tooth side of said form.

HARRY H. GOTBERG.